United States Patent [19]

Safarik

[11] Patent Number: 4,578,019
[45] Date of Patent: Mar. 25, 1986

[54] RAM AIR TURBINE

[75] Inventor: William F. Safarik, Manhatten Beach, Calif.

[73] Assignee: The Garrett Corporation, Los Angeles, Calif.

[21] Appl. No.: 383,084

[22] Filed: May 28, 1982

[51] Int. Cl.[4] .......................... F01D 7/02; F03D 7/04
[52] U.S. Cl. .......................................... 416/1; 416/32; 416/47; 416/151
[58] Field of Search .................. 416/1, 35, 32, 41 A, 416/151, 152, 47, 43, 48, 160, 162, 155

[56] References Cited

U.S. PATENT DOCUMENTS

| | | |
|---|---|---|
| 2,026,814 | 1/1936 | Caldwell et al. . |
| 2,140,718 | 12/1938 | Reissner ........................ 416/152 X |
| 2,160,324 | 5/1939 | Berges . |
| 2,307,334 | 1/1943 | Peek . |
| 2,314,610 | 3/1943 | Day . |
| 2,330,342 | 9/1943 | Dwelle . |
| 2,370,135 | 2/1945 | Berliner ............................ 416/152 |
| 2,399,685 | 5/1946 | McCoy . |
| 2,456,746 | 12/1948 | Snader . |
| 2,456,747 | 12/1948 | Snader et al. . |
| 2,456,748 | 12/1948 | Snader . |
| 2,782,601 | 2/1957 | Hamilton . |
| 2,874,787 | 2/1959 | Battenberg et al. . |
| 2,967,572 | 1/1961 | Breaux et al. ..................... 416/43 A |
| 2,986,219 | 5/1961 | Boardman, Jr. et al. . |
| 3,063,503 | 11/1962 | Blackburn . |
| 3,079,531 | 2/1963 | Tugwood . |
| 3,154,150 | 10/1964 | Dhonau ............................ 416/43 A |
| 3,672,788 | 6/1972 | Ellinger ................................ 416/43 |
| 4,047,842 | 9/1977 | Avena et al. .................... 416/160 X |

FOREIGN PATENT DOCUMENTS

| | | |
|---|---|---|
| 2834164 | 2/1980 | Fed. Rep. of Germany ... 416/41 A |
| 3031390 | 2/1982 | Fed. Rep. of Germany ... 416/43 A |
| 1050246 | 1/1954 | France ............... 416/41 A |
| 2313576 | 12/1976 | France ................. 416/35 |
| 546995 | 8/1942 | United Kingdom ................ 416/155 |

*Primary Examiner*—Everette A. Powell, Jr.
*Attorney, Agent, or Firm*—Terry L. Miller; Albert J. Miller

[57] ABSTRACT

Apparatus and methods for adjusting the pitch of a fluid reactive blade member carried upon a rotor in response to a speed difference between the rotor and a reference speed shaft.

23 Claims, 4 Drawing Figures

RAM AIR TURBINE

The field of this invention is aircraft ram air turbines. More particularly, this invention relates to ram air turbine apparatus and methods wherein a rotor carries at least one turbine blade which is exposed to the relatively moving air stream surrounding an aircraft. The turbine blade is fluid energy reactive with the airstream to provide a torque to and rotate the rotor. An energy absorbing device is drivingly coupled with the rotor to receive torque therefrom. The ram air turbine includes apparatus for varying the pitch of the turbine blade to control the rotational speed of the turbine rotor and driven device.

It will be apparent in view of the following that this invention also relates to an aircraft propeller wherein a rotor is driven by a power producing device on the aircraft and carries a propeller blade exposed to the airstream surrounding the aircraft to provide a propulsive force to the aircraft. The invention provides methods and apparatus to control the rotational speed of the power producing device by varying the pitch of the propeller blade.

Conventional ram air turbines are known wherein a rotor thereof is drivingly coupled to a power absorbing device such as a hydraulic pump or electrical generator to provide hydraulic or electrical power to the aircraft or to an auxiliary device carried by the aircraft. Such conventional ram air turbines usually include a governor apparatus for varying the pitch of the turbine blades to control turbine rotor speed. One conventional way of controlling turbine rotor speed is to employ a centrifugally responsive fly weight rotating with the rotor and opposing a resilient member to vary turbine blade pitch in a sense which controls rotor speed despite load variations on the power absorbing device and despite speed changes of the aircraft.

Such conventional ram air turbines have a number of recognized deficiencies. For example, such turbines are somewhat complex and expensive to manufacture. Additionally, the mechanism of the governor apparatus may require calibration in order for the governor to maintain a substantially constant and predetermined rotor speed during flight of the aircraft. Further, where such ram air turbines are employed on military aircraft and are used to provide operating power to an auxiliary device carried by the aircraft, such as an electronics module or a weapon system housed in a pod external of the aircraft, the turbine rotor may spin substantially from the time of aircraft takeoff until aircraft touchdown. Despite this substantially continuous operation of the ram air turbine during aircraft operation, the electronics module or weapon system may be in use only during a small fraction of the aircraft flight. Consequently, the ram air turbine is subject to operation and wear for a much longer period of time than its period of effective use. For example, a military aircraft may fly for several hours away from its home field before reaching an enemy target. After spending a few minutes over the target, the aircraft again flys several hours in returning to its home field. During this flight, a ram air turbine may provide power to the aircraft or to an auxiliary device only while the aircraft is near the target. Despite this fact, the ram air turbine will spin substantially continuously even though it is producing no utilized power during most of the aircraft flight. Such use leads to failures of ram air turbines and to incapacitation of the auxiliary devices they power. Of course, the worst type of ram air turbine failure in a military situation is one occurring while the aircraft is in flight toward or over an enemy target. Such failure leaves the aircraft without a necessary weapon or auxiliary device and may result in the loss of the aircraft and crew.

A conventional expedient in view of the above deficiency of conventional ram air turbines is simply to provide a brake on the turbine rotor and prevent its rotation except when the turbine is to provide power. However, braking a conventional ram air turbine to stop its rotation may cause the turbine blades thereof to move to their fine pitch position unless additional apparatus is provided to feather the turbine blades. If the turbine blades are allowed to move to their fine pitch position, the parasitic drag of the ram air turbine upon the aircraft is increased greatly. Of course, such an increase in drag adversely affects aircraft speed, range, and fuel consumption. On the other hand, if additional apparatus is provided to feather the turbine blades when the rotor is braked, the complexity and cost of the ram air turbine are increased: as are the chances of its malfunctioning.

U.S. Pat. Nos. 2,777,524; 2,874,787: 2,963,093; 2,964,111; 2,967,572; 2,970,652; 2,986,219: and 3,063,503; are believed to relate to air driven turbines and to be directly relevant to the subject invention. Further, U.S. Pat. Nos. 2,026,814: 2,160,324; 2,314,610; 2,330,342; 2,399,686; 2,456,746; 2,456,747; 2,456,748; 2,782,601; and 3,079,531: are believed to relate to propeller speed or pitch control apparatus and to be less directly relevant to the subject invention.

SUMMARY OF THE INVENTION

The invention provides apparatus and methods wherein a rotor is exposed to a relatively moving stream of air. An aerodynamically reactive blade is carried by the rotor and is pivotal between a first feathered null position and a second position wherein the blade is reactive with the airstream to transmit a torque to or from the rotor. The rotor is drivingly connected to a power absorbing or power producing device. The apparatus includes a reference shaft having a predetermined speed of rotation. A linkage couples the reference shaft to the aerodynamicaly reactive blade to pivot the latter in response to a speed difference between the rotor and the reference shaft. The linkage is arranged to increase the blade pitch toward a feathered position if the rotor rotates faster than the reference shaft and to decrease the blade pitch toward a fine pitch position, if the rotor rotates slower than the reference shaft. Thus, the pitch of the aeroreactive blade is changed to substantially match rotor speed to reference shaft speed regardless of the sense and magnitude of the torque transmission between the rotor and the blades.

When the use of the invention comprises a ram air turbine, the turbine may be started and stopped by starting and stopping the reference shaft. The aeroreactive blades, which in this case are turbine blades, are pivotally moved, by the linkage between a feathered null position and a fine pitch position to match the rotational speed of the turbine to the reference shaft speed regardless of the load on the power absorbing device of the ram air turbine. Thus, an aircraft may be operated in flight with the reference shaft of a ram air turbine stopped so that the turbine and power absorbing device do not rotate and are not subject to wear and failure. When power is needed from the ram air turbine, the reference shaft is rotated so that the turbine blades are moved to pitch-defining positions driving the turbine at substantially reference shaft speed to drive the power absorbing device. When power is no longer needed from the ram air turbine, the reference shaft is stopped and the relative over speed of the turbine as the reference shaft slows moves the turbine blades to their feathered null position, stopping the turbine.

When the invention is used in conjunction with a propulsion engine and propeller, the pitch governing function of the invention is as described above with the exception that the aeroreactive blades transmit power to the airstream. If the propulsion engine fails so that the propeller must be feathered, the reference shaft is stopped. Thus, the relative overspeed of the propeller causes the linkage to feather the propeller blades and stop the propeller rotation. By providing a reversible reference shaft, the propeller blades may be moved to any desired pitch position within their range of motion even when the propulsion engine is not operating. For example, it may be desired to change the pitch of the propeller blades prior to starting the propulsion engine while the aircraft is on the ground. Further, by providing a variable speed reference shaft whose speed is matched to a desired speed for the propeller, the pitch of the propeller blades, and thus the speed of the propeller, may be controlled as the propulsion engine power output is changed; as during taxiing and ground maneuvering of an aircraft.

According to one embodiment of the invention, the reference shaft itself is powered by a pilot ram air turbine having a centrifugally responsive govenor and providing a speed reference to a larger ram air turbine. By braking the pilot ram air turbine, the blades of the large ram air turbine may be feathered to stop rotation thereof. The pilot ram air turbine is of sufficiently small size that even though when stopped its turbine blades assume their fine pitch position producing maximum aerodynamic drag, the performance of the aircraft is not significantly affected.

DETAILED DESCRIPTION OF THE PREFERRED EMBODIMENTS

Figure 1:
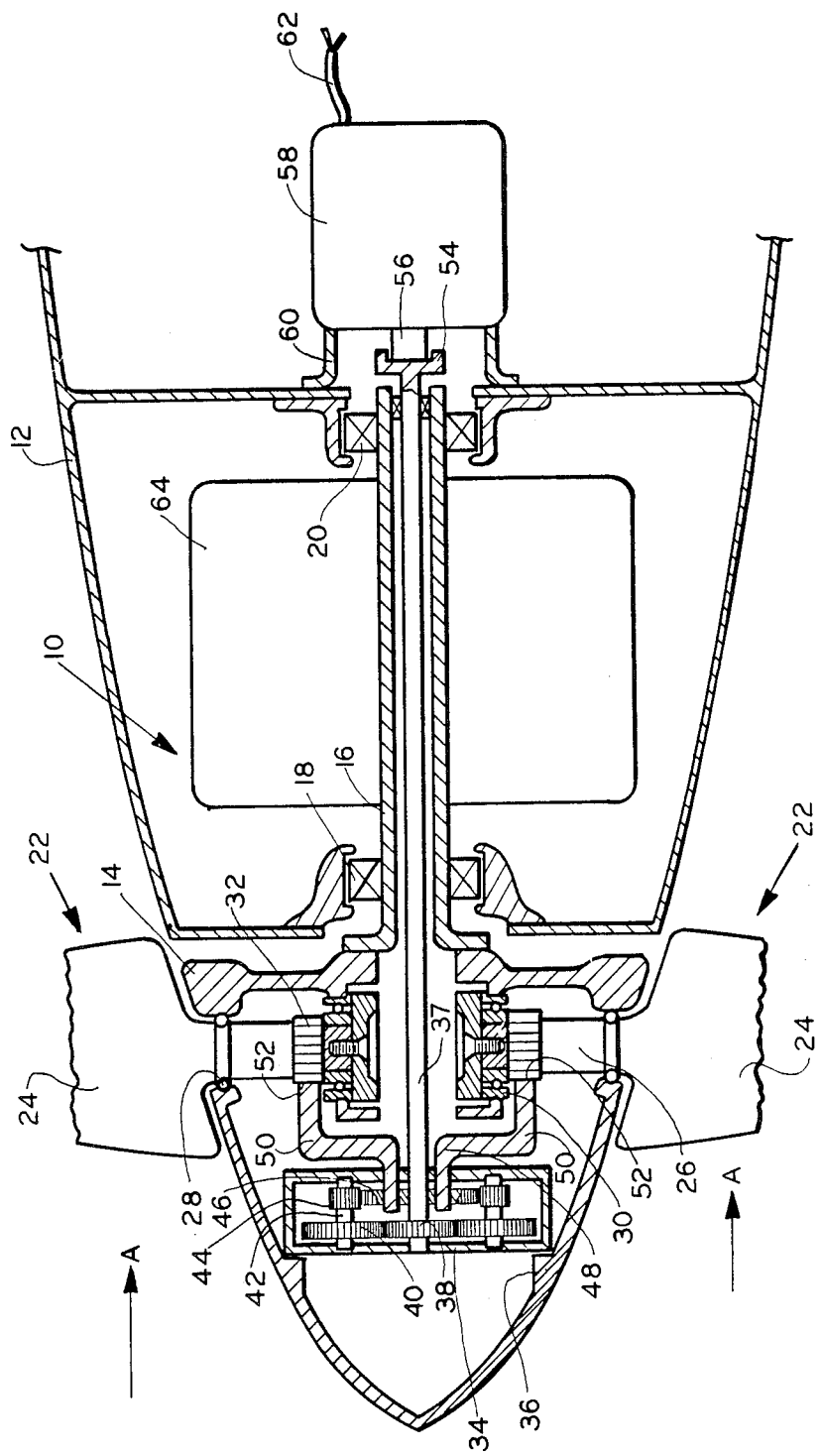
FIG. 1 schematically illustrates a fragmentary longitudinal cross sectional view of apparatus embodying the invention.

With reference to FIG. 1, the numeral 10 generally designates apparatus according to the invention. The apparatus 10 is housed within a nacelle 12, only a portion of which is illustrated. The nacelle 12 may be a part of an aircraft (not shown) or may be part of an auxiliary pod or package carried by an aircraft. In either case, the nacelle 12 is exposed to the free stream of relatively moving air which surrounds the aircraft in flight, as represented by arrows A. A spinner or rotor 14 of the apparatus 10 defines a streamlined end portion of the nacelle 12. The rotor 14 is carried by an annular shaft 16 journaled within the nacelle 12 by bearings 18 and 20. A multitude of aerodynamically reactive blade members 22, (only two of which are illustrated) are pivotally carried by the rotor 14. The blade members 22 include a fluid reactive portion 24, (only a portion of which is illustrated) which is exposed to the airstream A and a stem portion 26 which is journaled within the rotor 14 by bearings 28 and 30 carried by the latter. Intermediate of the bearings 28 and 30, the stem portion 26 defines a gear sector 32 which at least partially circumscribes the stem portion 26.

A gear case 34 is carried by the rotor 14 on an internal shoulder 36 thereof. The gear case 34 journals an elongate axially extending input shaft 37 carrying a pinion 38. The pinion 38 meshes with a relatively larger gear 40 carried by a lay shaft 42. The lay shaft 42 is journaled by the gear case 34 and carries a pinion 44 meshing with a relatively larger annular gear 46. An annular shaft 48 journaled in the case 34 carries the gear 46 and extends from the gear case 34 concentric with the input shaft 37. Gears 38, 40, 44 and 46 cooperate to define an epicyclic gear train within gear case 34. It will be understood that the gear case 34 includes liquid seals and antifriction bearings which are not illustrated in the interest of simplicity but which allow the case 34 to receive a lubricant and provide a low overall frictional loss therein. Further, it is apparent that the gear case 34 provides a high ratio of speed reaction from shaft 37 to shaft 48 and a commensurate large ratio of torque therebetween. The shaft 48 carries a multitude of radially and axially extending arms 50 (only two of which are illustrated) respectively extending to the gear sectors 32 of each blade member 22. Each arm 50 defines an axially disposed arcuate face gear segment or rack 52 which meshes with the respective gear sector 32. Thus, rotation of the shaft 48 relative to rotor 14 causes simultaneous pivotal movement of the multitude of blade members 22 relative to the rotor 14. The blade members 22 are pivotal between a feathered null position relative to the airstream A and a reactive fine pitch position.

The input shaft 37 extends through the annular shafts 16 and 48 and projects from the right end of the former to define a socket 54. The output shaft 56 of a reference speed motor 58 is received in the socket 54 to drivingly couple with the shaft 37. An annular flange 60 secures the motor 58 to the nacelle 12. An electrical power cord 62 connects the motor 58 to a source of electrical power (not shown).

A power absorbing or power producing transducing device 64 circumscribes the shaft 16 and is drivingly connected thereto. The transducing device 64 may be of the power absorbing type in which case the apparatus 10 is used to extract energy from the free air stream A. For example, the device 64 may be a hydraulic pump or an electrical generator. In such use, the apparatus 10 is recognizable as a ram air turbine. On the other hand, the device 64 may be a propulsion engine in which case the apparatus 10 is employed to transfer energy produced by the device 64 to the free air stream A and provide a propulsion force for the aircraft. For example, the device 64 may be a turboprop engine wherein the annular shaft 16 is a part of the power output gear case of the engine and carries a propeller (rotor 14 with blade members 22). In such use, the apparatus 10 is recognized as a propeller pitch control system.

Having observed the structure of the apparatus 10, attention may now be directed to its operation; first, as a ram air turbine and second, as a propeller pitch control system.

Viewing FIG. 1, with the reference motor 58 inoperative, the shafts 16 and 56 do not rotate and the blade members 22 occupy their feathered null positions. In other words, the blade members 22, if symmetrical are oriented with respect to freestream A so as to define a zero angle of attack, and if cambered are oriented so as to produce neither a clockwise nor counterclockwise torque on rotor 14. Thus, the ram air turbine 10 is dormant with the parts thereof stationary and saved from wear and possible failure.

In order to activate the ram air turbine 10, the reference motor 58 is activated by supplying electrical power thereto via power cord 62. The output shaft 56 of motor 58 begins to rotate and accelerates to the substantially constant operating speed of motor 58. Because at the outset the shaft 16 is stationary, the motor 58 pivots the blade members away from their feathered null position via the mechanical linkage therebetween, including shaft 37, the gear train in gear case 34, arms 50, and meshing gear sectors and racks 32, 52. The blade members 22 are pivoted to define a pitch angle relative to the free stream A. Consequently, the blade members 22 exert a torque on the rotor 14 to rotate the latter in the same direction as the shaft 56 of motor 58. So long as the rotor 14 is rotating slower than shaft 56 of motor 58, the mechanical linkage including gear case 32 will continue to pivot the aeroreactive blades 22 in a direction toward the fine pitch position thereof and increasing the torque exerted by the blades upon rotor 14. Consequently, a pitch angle is eventually achieved wherein the torque exerted by the blades 22 upon the rotor 14 matches the torque loading of the power absorbing device 64 and the rotational speed of rotor 14 matches that of shaft 56. It will be understood that the mechanical linkage between shaft 56 and aeroreactive blades 22 provides a high ratio of speed reduction so that the pivoting movement of the blades 22 is relatively slow, even though the speed differential between shaft 56 and rotor 14 may at times be several hundreds of R.P.M., or more. Further, the high torque multiplication provided by the linkage allows a relatively small, low-torque motor 58 to pivot the blades 22 despite the aerodynamic loads on the latter.

Should the speed of the aircraft or the torque load of device 64 increase or decrease, the speed of rotor 14 varies so that once again a speed differential exists between rotor 14 and motor shaft 56. Consequently, the blades 22 will be pivoted by the linkage including gear case 34 in a direction to null out the speed differential and match the speed of rotor 14 to the speed of shaft 56.

In order to stop operation of ram air turbine 10, the power supply to motor 58 is switched off so that the shaft 56 thereof coasts to a stop. The relative overspeed of rotor 14 causes the blades 22 to be pivoted toward their feathered null position so that the rotor 14 also comes to a stop.

When the apparatus 10 is employed as a propeller pitch control system, the power producing device (engine) 64 drives the rotor (propeller) 14 to provide a propulsive force to the aircraft via aeroreative blades 22. The shaft 56 of motor 58 rotates at a selected speed which is the desired speed of operation for engine 64.

In the event that the power output of engine 64 exceeds the power absorption of propeller 14 at the desired speed, the speed of the latter exceeds the desired operating speed and the speed of shaft 56. The relative overspeed of propeller 14 causes the blades 22 thereof to pivot toward their feathered null position. That is, the blades 22 pivot toward a coarse pitch position wherein they absorb a greater amount of power from engine 64. Consequently, the speed of propeller 14 is slowed to match that of motor 58. The propeller blades 22 are also pivotal toward a fine pitch position in the event that the speed of propeller 14 is slow relative to motor 58. Should the engine 64 fail during flight of the aircraft, the motor 58 is switched off so that the relative overspeed of propeller 14 causes the blades 22 to be pivoted to a feathered null position stopping rotation of propeller 14.

It is easily understood in light of the above that by providing motor 58 with a variable speed of operation, the operating speed of engine 64 may be controlled to any desired speed by controlling the pitch and power absorption of the blades 22 upon propeller 14. Further, by providing a motor 58 which is reversible the propeller blades 22 may be pivoted in either direction within their range of motion even though the engine 64 is not operating.

Figure 2:
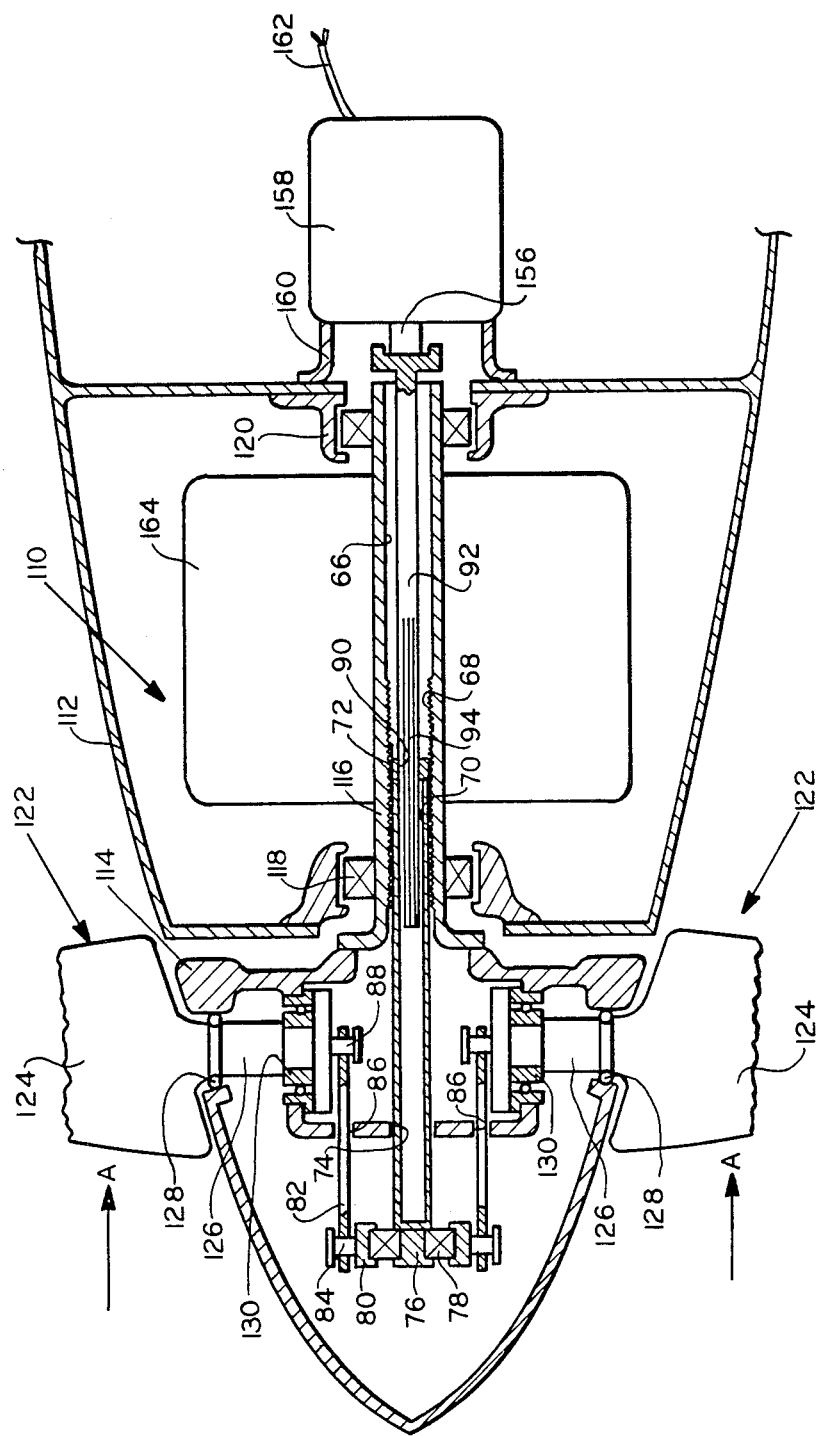
FIG. 2 is similar to FIG. 1 and schematically illustrates an alternative embodiment of the invention.

FIG. 2 illustrates an alternative embodiment of the invention which is similar in structure and operation to the embodiment depicted in FIG. 1 with the exception of the mechanical linkage coupling the reference speed motor to the aeroreactive blades. Accordingly, features on FIG. 2 which are analogous to those illustrated in FIG. 1 are referenced with the same numeral used previously and increased by 100.

Viewing FIG. 2, the annuar shaft 116 includes a bore portion 66 defining a relatively fine-pitch screw thread 68 therein. A tubular push rod member 70 is received in the bore portion 66 and defines an enlarged annular end portion 72 which threadably engages the screw thread 68. The push rod member 70 slidably passes through a bore 74 defined by the rotor 114 and defines another end portion 76. Captured upon the end portion 76 is a bearing 78 which carries an annular collar 80. A link 82 pivotally engages the collar 80 via a pin 84 and extends through a guide aperture 86 defined by rotor 114 to pivotally engage a crank pin 88. The crank pin 88 is carried by the aeroreative blade 122 eccentric to the pivotal axis defined by bearings 128 and 130. Consequently, rotation of the push rod member 70 with respect to rotor 114 causes axial movement of collar 80 and link 82 and pivotal movement of the blades 122.

In order to effect relative rotation of the push rod member 70, the annular end portion 72 thereof defines a splined bore 90. An elongate shaft 92 defines a splined portion 94 which is received in the push rod member 70 and couples with the end portion 72 thereof. The shaft 92 is drivingly coupled with the shaft 156 of motor 158, which also restrains axial movement of the shaft 92.

A relative speed difference between shaft 156 and rotor 114 causes relative rotation of push rod member 70 and axial movement thereof to pivot blades 122. The member 70 slides axially relative to shaft 92 while remaining in driving engagement with the splined portion 94 thereof. Thus the embodiment of FIG. 2 operates similarly to that of FIG. 1 and may function either as a ram air turbine or as a propeller pitch control system.

Figure 3:
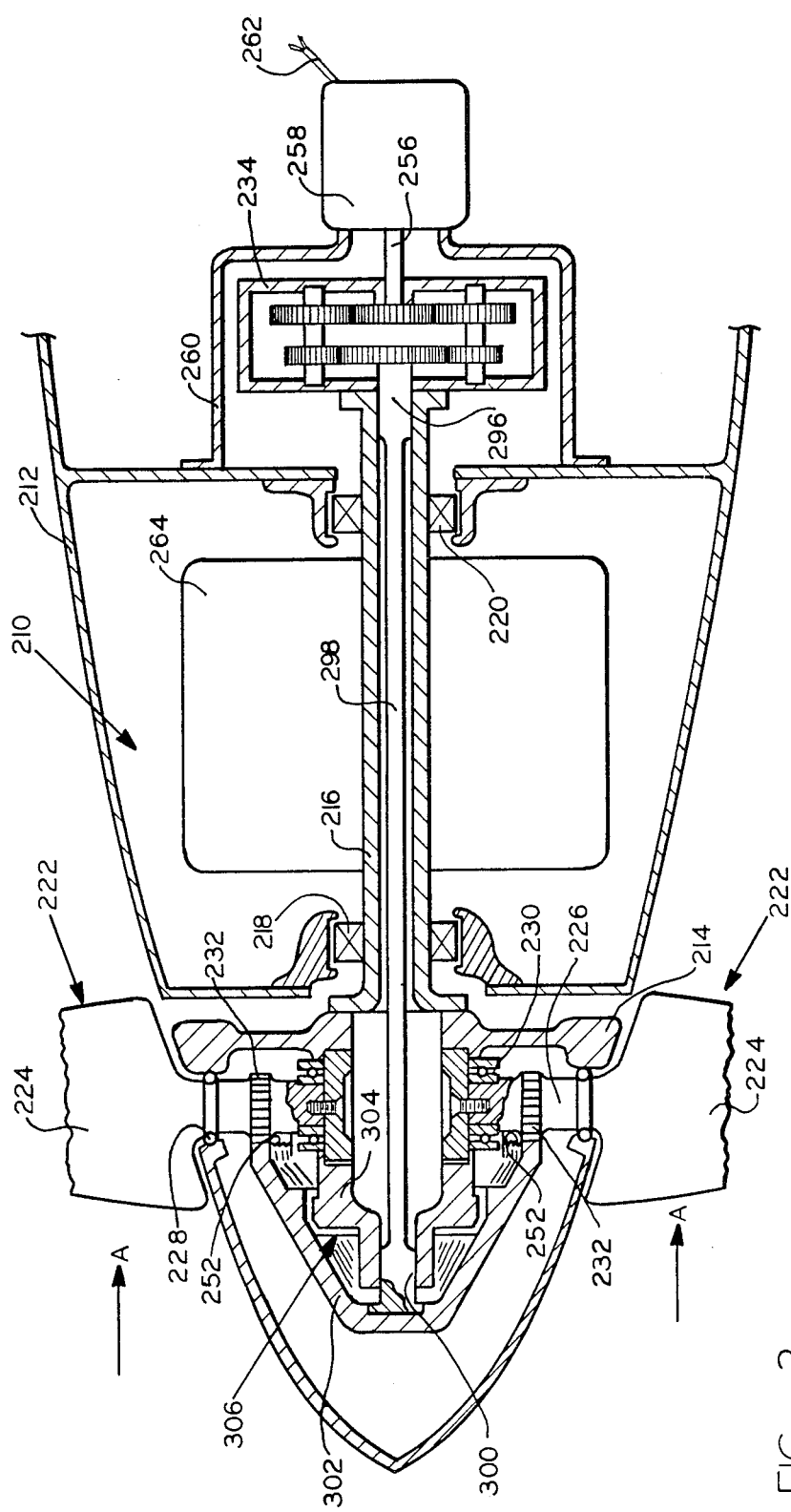
FIG. 3 is similar to FIGS. 1 and 2 and illustrates yet another alternative embodiment of the invention.

FIG. 3 illustrates yet another alternative embodiment of the invention wherein features analogous in structure or function to features of FIG. 1 are referenced with the same numeral used supra and increased by 200.

Similarly to the embodiment of FIG. 1, the apparatus 210 of FIG. 3 includes a gear case 234 which rotates with a rotor 214. However, the gear case 234 of the embodiment of FIG. 3 is carried at the right end of the annular shaft 216 remote from the rotor 214. The gear case 234 provides a relatively high ratio of speed reduction and torque increase between a shaft 256 of speed reference motor 258 and an output shaft 296 of the gearcase. The output shaft 296 includes an elongate reduced diameter torsionally resilient portion 298 extending within the shaft 216 to the rotor 214. At its left end within the rotor 214, the shaft 296 is journaled in a bore 300 defined by the rotor 214. A hollow, somewhat cone-shaped member 302 is attached to the left end of shaft 296 and is rotationally movable relative to the rotor 214. The member 302 defines an arcuate face gear rack 252 meshing with a gear sector 232 defined upon the stem portion 226 of each blade member 222. Thus, relative rotation of the member 302 causes pivotal movement of the blade members 222. The member 302 further cooperates with a hub portion 304 of the rotor 214 to define a centrifugally responsive apparatus of conventional design generally referenced by the numeral 306. By way of example only, the apparatus 306 may be similar in structure or principle of operation to the apparatus described in U.S. Pat. No. 2,967,572 which is assigned to the assignee of the present application and the disclosure of which is expressly incorporated herein to the extent necessary for a complete understanding of the invention. The apparatus 306 includes fly weights (not shown) rotating with the rotor 214 and cooperating with member 302 to rotationally bias the latter in a direction feathering the blades 222 in response to centrifugal force.

When the apparatus 210 is in operation, the reference speed motor shaft 256 rotates at a determined speed and pivots the blades 222 to a pitch-defining position via the gear case 234, shaft 296 and member 302 engaging the gear sectors 232. Because the centrifugally responsive apparatus 306 rotates with the rotor 214, it provides a bias moving the blades 222 toward their feathered position in opposition to the reference speed motor. The bias provided by apparatus 306 is a function of the rotational speed of rotor 214. Thus, a torque balance is attained wherein the torque provided by motor 258 and multiplied by gear case 234 balances the opposing bias of apparatus 306. Consequently, the rotor 214 rotates in synchronization with shaft 256 of reference speed motor 258. Because the torsionally resilient portion 298 of shaft 296 must transmit the multiplied torque of motor 258, the portion 298 thereof twists and stores a considerable quantity of energy therein before the torque balance condition is attained.

In the event that the speed of the aircraft or the load upon or power output of device 264 should change so that the speed of rotor 214 changes from the speed of motor 258, the bias provided by apparatus 306 changes accordingly. In response to the changed bias of the apparatus 306 the shaft portion 298 either twists or untwists to respectively receive or provide energy moving the blades 222 toward a position to minimize the speed change of rotor 214. The changed speed of rotor 214 results in a speed differential between gear case 234 and motor shaft 256 so that the right end of shaft 296 is rotated relative to shaft 216 via the gear train within gear case 234 to once again attain a torque balance between apparatus 306 and motor 258. While the interaction of torsionally resilient shaft 296 with apparatus 306 cannot completely eliminate speed changes of the rotor 214 as the speed of the aircraft or torque of device 264 changes, these transient speed changes are reduced in magnitude by the embodiment of FIG. 3.

Figure 4:
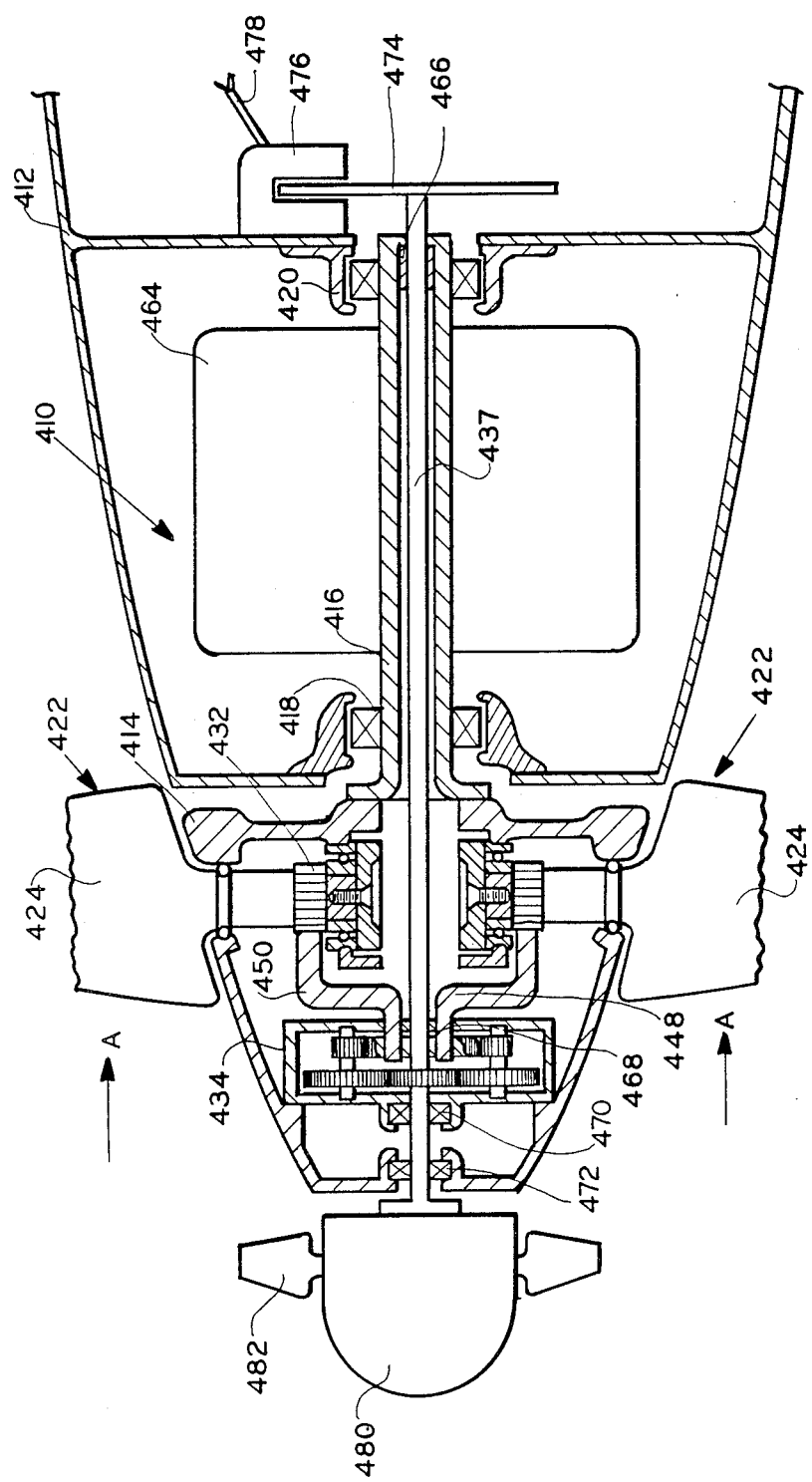
FIG. 4 is similar to FIGS. 1-3 and illustrates still another embodiment of the invention.

FIG. 4 illustrates another alternative embodiment of the invention wherein features analogous in structure of function to those of FIG. 1 are referenced with the numeral used supra and increased by 400. The apparatus 410 is similar in structure to apparatus 10 of FIG. 1 with exception to that explained infra.

Apparatus 410 includes an input shaft 437 which is journaled within the shaft 416 and rotor 414 by bearings 466–472. At its right end, the shaft 437 carries a brake disc 474. An electrically activated brake caliper 476 straddles the brake disc 474. The caliper 476 is operative to brake and to release the disc 476 in response to an electrical signal supplied to the caliper via a cable 478.

At its left end, the shaft 437 extends from the rotor 414 and carries a pilot ram air turbine 480. The pilot ram air turbine 480 includes a multitude of aerodynamically reactive pilot turbine blades 482 extending into the free air stream A and function similarly to a windmill. The pilot blades 482 are pivotally movable by a centrifugally responsive speed governor (not shown) of conventional design within the pilot turbine 480. Thus, when the shaft 437 is not braked by caliper 476 acting on disc 474, the pilot turbine 480 rotates the shaft 437 at a determined reference speed controlled by the centrifugal governor therein. The aeroreactive blades 422 upon rotor 14 are angularly moved via the linkage including gear case 432 to a pitch-defining position such that the rotational speed of rotor 14 matches that of pilot turbine 480.

When the brake caliper 476 is activated to stop rotation of shaft 437 and pilot turbine 480 by braking disc 474, the relative overspeed of the rotor 414 causes the blades 422 to be pivoted to their feathered null position; stopping rotation of rotor 414.

In view of the above, it is easily seen that the invention relates both to apparatus and methods of adjusting the pitch of a fluid energy reactive blade member carried upon a rotor to control the speed of rotation of the rotor with regard to a reference speed. While the invention has been described by reference to aircraft ram air turbines, which are, of course, a specie of windmill, no limitation upon the invention is implied by such reference. Accordingly, the invention also has applicability to windmills. Further, the invention has application to turbines driven by fluids other than air. For example, principles of the invention may be employed to control the pitch of a hydraulic turbine as in a hydroelectric power plant. Still further, even though the invention has been described by reference to aircraft propeller blade pitch control system, no limitation is implied because of this reference. Accordingly, the invention has applicability to other types of fluid energy reactive apparatus having variable pitch blades. For example, the invention may be used to control the pitch of a marine propeller on a ship. The invention is intended to be limited only by the scope and spirit of the appended claims which define the invention.

I claim:

1. The method of pivotally adjusting the relative pitch of a fluid energy reactive blade member carried upon a rotor member comprising the steps of providing a reference speed shaft, coupling said reference speed shaft to said blade member via linkage means rotatable with said rotor member, pivoting said blade member via said linkage means in response to a rotational speed difference between said reference speed shaft and said rotor member, and providing a centrifugally responsive apparatus in association with said linkage means for pivotally adjusting the pitch of said blade member in response to rotation of said rotor member.

2. The method of claim 1 including providing said linkage means with an energy storage portion disposed between said reference speed shaft and said centrifugally responsive apparatus with respect to transmission of relative motion between said reference speed shaft and said blade member.

3. The method of claim 2 including using an elongate torsionally resilient shaft as said energy storage portion of said linkage means.

4. The method of claim 3 including using a rotational speed reduction apparatus as a portion of said linkage means.

5. The method of claim 4 including using an epicyclic gear train as said rotational speed reduction apparatus.

6. The method of claim 5 including disposing said epicyclic gear train externally of said rotor.

7. The method of claim 1 including disposing said centrifugally responsive apparatus within said rotor.

8. The method of controlling the rotational speed of a rotor member carrying a fluid energy reactive blade member thereon, said blade member being pivotally disposed upon said rotor member to define a pitch angle and being in energy exchange relation with a fluid to exert a first torque compelling or resisting rotation of said rotor member, said rotor member being coupled to a device exerting a second torque thereon opposing said first torque to respectively resist or compel rotation of said rotor member, said method comprising the steps of providing a rotatable reference speed shaft, coupling said reference speed shaft via linkage means with said blade member to pivot the latter, and adjusting the pitch angle of said blade member via said linkage means in response to a rotational speed difference between said rotor member and said reference speed shaft to match said first torque with said second torque; said coupling step including providing said linkage means with speed reduction apparatus providing a relatively great ratio of torque multiplication from said reference speed shaft to said blade member, and rotating said speed reduction apparatus in unison with said rotor member so that a rotational speed difference between the latter and said reference speed shaft causes pivotal movement of said blade member, and providing centrifugally responsive means rotating with said rotor member and cooperating with said linkage means to pivotally bias said blade member in a first direction in response to rotation of said rotor member.

9. The method of claim 8 including providing said linkage means with a resilient energy storage portion interposed between said reference speed shaft and the point where said centrifugally responsive means cooperates with the remainder of said linkage means.

10. In a ram air turbine for use aboard an aircraft, said ram air turbines including a rotational power absorbing device, a rotor member communicating with the free stream of relatively moving air surrounding said aircraft in flight, first means coupling said rotor member and said power absorbing device for rotation in unison, a multitude of aerodynamically reactive turbine blades pivotally carried upon said rotor member and pivotal relative thereto to define a variable pitch angle to rotationally drive said rotor member, the method of controlling the rotational speed of said rotor member comprising the steps of providing a rotatable reference speed shaft, coupling said reference speed shaft to said multitude of blade members via second coupling means rotatable with said rotor member to pivot said turbine blades, and adjusting the relative pitch defined by said turbine blades to maintain a predetermined rotational speed ratio between said rotor member and said reference speed shaft, employing a mechanical apparatus as a portion of said second coupling means, and causing said mechanical apparatus to provide a relatively high ratio of speed reduction and torque multiplication between said reference speed shaft and said multitude of turbine blades, employing an epicyclic gear train as a portion of said mechanical apparatus, disposing said epicyclic gear train remotely from rotor member, employing a centrifugally responsive apparatus rotating with said rotor member and cooperating with said second coupling means to bias said turbine blades in a first pivotal direction in response to rotation of said rotor member, and providing for resilient storage of mechanical energy within a portion of said second coupling means intermediate of said epicyclic gear train and the point of cooperation of said centrifugally responsive apparatus with said second coupling means.

11. The method of claim 10 including disposing said epicyclic gear train within said rotor member.

12. The method of claim 10 including using an elongate torsionally resilient shaft to provide said mechanical energy storage.

13. The method of claim 12 including disposing said torsionally resilient shaft within said first coupling means.

14. In an aircraft propeller pitch control system including an engine driving a propeller carrying variable pitch propeller blades, the method of controlling the operating speed of said engine by adjusting the pitch of said propeller blades to match the torque output of said engine with the torque absorption of said propeller, said method comprising the steps of providing a reference speed shaft, and coupling said reference speed shaft with said propeller blades via coupling means to adjust the pitch of said blades in response to a speed difference between said reference speed shaft and said propeller, said coupling means in its entirety rotating with said propeller and reference speed shaft, employing an epicyclic gear train as a portion of said coupling means, disposing said gear train remote from said propeller, and coupling said gear train with said propeller blade via an elongate torsionally flexible shaft defining a part of said coupling means, disposing a centrifugally responsive apparatus within said propeller for rotation therewith, and employing said centrifugally responsive apparatus to bias said propeller blade toward a course pitch position in response to rotation of said propeller.

15. The method of claim 14 including disposing said gear train within said propeller.

16. The method of claim 14 including disposing said gear train remote from said propeller, and coupling said gear train with said said propeller blade via an elongate torsionally flexible shaft defining a part of said coupling means.

17. In a ram air turbine having a rotor carrying a turbine blade which is pivotal to vary the pitch angle defined thereby, said rotor being coupled with a power absorbing device, and means for pivoting said turbine blade, the method of controlling the rotational speed of said rotor comprising the steps of utilizing a reference speed shaft operatively coupled with said pivoting means to vary said pitch angle in response to a rotational speed difference between said rotor and said reference speed shaft, and employing centrifugally responsive apparatus rotating with said rotor to bias said turbine blade toward a coarse pitch position.

18. The method of claim 17 including utilizing a part of said coupling means which is disposed between said reference speed shaft and said centrifugally responsive apparatus to resiliently store mechanical energy.

19. The method of claim 18 including employing energy from one of said centrifugally responsive apparatus and said resilient part of said coupling means to adjust said pitch angle by pivoting said turbine blade in a sense which reduces a rotational speed difference between said rotor and said reference speed shaft, whereby transient speed changes of said ram air turbine are reduced.

20. The method of controlling the speed of rotation of a rotor carrying a fluid energy reactive blade member which is pivotal relative to said rotor, said method comprising the steps of:

providing a reference speed shaft;
providing linkage means coupling said blade member with said reference speed shaft for pivoting the former in response to a speed differential between the latter and said rotor;
rotating said reference speed shaft in a first direction;
rotating said rotor in said first direction;
arranging said linkage means to pivot said blade member in a sense tending to match rotor speed with reference shaft speed;
providing apparatus in cooperation with said linkage means for biasing said blade member in opposition to said linkage means as a function of rotor speed; and
providing an energy storage portion in said linkage means between said reference speed shaft and the point where said biasing apparatus cooperates with said linkage means.

21. The method of claim 20 including the step of transferring energy to and from said energy storage portion of said linkage means to pivot said blade member during speed change of said rotor.

22. In apparatus having a first rotatable power producing or power absorbing device drivingly coupled with a rotor, said rotor carrying a fluid energy reactive blade member thereon, said blade member being pivotal to define a pitch angle so as to assist or resist rotation of said rotor by interaction with a fluid, the method of maintaining the speed of rotation of said rotor substantially constant despite variation both of the power output or power absorption of said device and of the interaction of said blade member with said fluid, said method comprising the steps of providing a reference speed motor having a rotatable reference speed shaft, drivingly coupling said reference speed shaft with said device via shaft means having first and second relatively rotatable portions, providing means operatively associated with said first and second shaft portions for pivoting said blade member to adjust the pitch angle defined thereby in response to relative rotation of said first and second shaft portions, and operating said reference speed motor to rotate one of said first and second shaft portions at a substantially constant speed; and further including the process of reducing transient rotational speed changes resultfrom variation of said power output or power absorption of said device or from variation of said interaction of said blade member with said fluid, said transient reducing process including the steps of providing centrifugally responsive means in association with said blade pivoting means for yieldably biasing said blade member in response to rotation of said rotor toward a feathered null position wherein said blade member is not interactive with said fluid, providing resilient energy storage means interposed in said one shaft portion between the coupling thereof with said shaft of said reference speed motor and said association of said one shaft portion with said blade pivoting means for biasing said blade member away from null position, and transferring energy to or from said storage means in response to a rotational speed change to match the bias of the latter with that of said centrifugally responsive means and pivot said blade member in a direction to reduce said rotational speed change.

23. The method of making a ram air turbine comprising the steps of:

providing a rotor drivingly connectable to a torque absorbing device;
providing turbine blades pivotal upon said rotor to define a pitch angle;
providing a rotatable reference speed shaft;
coupling said reference speed shaft to said turbine blades via linkage arranged to pivot the latter in response to a rotational speed differential between said reference speed shaft and said rotor;
providing centrifugally responsive means for biasing said turbine blades toward a feathered null position in response to rotation of said rotor; and
providing resilient energy storage means in said linkage.

* * * * *